United States Patent [19]

Korkmaz

[11] 4,262,026

[45] Apr. 14, 1981

[54] METHOD AND APPARATUS FOR DIFFERENTIAL COOKING OF FOODS

[76] Inventor: Ishak Korkmaz, 8½ Colonial Pl., Asheville, N.C. 28804

[21] Appl. No.: 7,348

[22] Filed: Jan. 29, 1979

[51] Int. Cl.³ .............................................. A47J 27/10
[52] U.S. Cl. .................................... 426/243; 426/238; 426/510; 426/523; 99/447; 99/453
[58] Field of Search ............... 426/237, 243, 238, 510, 426/523; 99/447, 453

[56] References Cited

U.S. PATENT DOCUMENTS

| | | | |
|---|---|---|---|
| 2,300,837 | 11/1942 | Ames | 99/447 |
| 3,212,426 | 10/1965 | Lewus | 99/447 X |
| 4,065,583 | 12/1977 | Ahlgren | 426/523 X |
| 4,080,524 | 3/1978 | Greenfield, Jr. et al. | 426/243 X |

*Primary Examiner*—Arthur D. Kellogg

[57] ABSTRACT

The invention is directed to a new form of cooking, although the principle involved may be applied to other arts. Specifically, the invention is directed to cooking of foods in which it is desired to keep one side of a food being baked at a relatively constant cooler temperature than the other side.

6 Claims, 5 Drawing Figures

METHOD AND APPARATUS FOR DIFFERENTIAL COOKING OF FOODS

DESCRIPTION OF THE PRIOR ART

The preparation of pasta or crust type foods is significantly enhanced by the present invention, for it is these foods having a sauce on a crust base that are difficult to cook so that the crust and sauce are properly prepared. If the crust is thick, the sauce can be evaporated by the time the crust is cooked properly. Conversely, a thin crust may be too well done and dried if too much sauce is placed on the crust.

Presently used methods also limit the type sauces and toppings that can be used. Use of a sauce requiring cooking on a crust to also be cooked requires a delicate balancing of the topping and crust material so that one is not done too soon in advance of the other.

BRIEF DESCRIPTION OF THE PRESENT INVENTION

In the present invention, use is made of means in a baking oven to keep the surface of the upper side of the food to be cooked, or the lower side as desired, at a temperature lower than the ambient temperature of the oven.

Baking ovens are normally operated at temperatures of 400° F. and above. It would be advantageous in cooking pasta or crust type foods to precook the crust for later usage. In a commercial restaurant, for example, when an order is placed for a particular type sauce for pizza, the prepared sauce would be placed on a precooked crust and the combined crust and sauce placed in an oven of 500° F. temperature. The combined crust and sauce would be placed on the surface of a flat plate through which a liquid, such as water is circulated from a reservoir. Other liquids with different boiling points may be used depending on the particular requirements.

The surface temperature of the flat plate can be kept at any desired temperature by adjusting the flow of liquid through the plate and/or the liquid reservoir temperature. In such a manner the crust can be prevented from overcooking while the sauce is being prepared to the desired degree of doneness.

Another effective means to reduce the lower surface cooking of thin, flat crusted foods in a high temperature radiant oven is to suspend the food over a pan of liquid. Water, for example boils at 212° F. at sea level, and remains constant at that temperature unless superheated—a condition unlikely to be found in baking ovens.

The steam from the boiling water contacts the lower surface of the food while the upper surface is being radiated with high temperature heat of 400° F. to 500° F.—causing the upper surface to cook faster than the lower surface. The steam boiling from the water pan also tends to freshen the dough crust.

It may also be advantageous to "cool" the upper surface of the food to be cooked and this can be done by placing the food under a pan of liquid such as water in a high temperature radiant oven. The temperature of the pan will remain at the liquid boiling point, providing an "awning" for the upper surface of the food while the lower surface may be heated at a higher temperature from a heat source in the bottom of the oven.

DETAILED DESCRIPTION OF THE DRAWINGS

Figure 1:
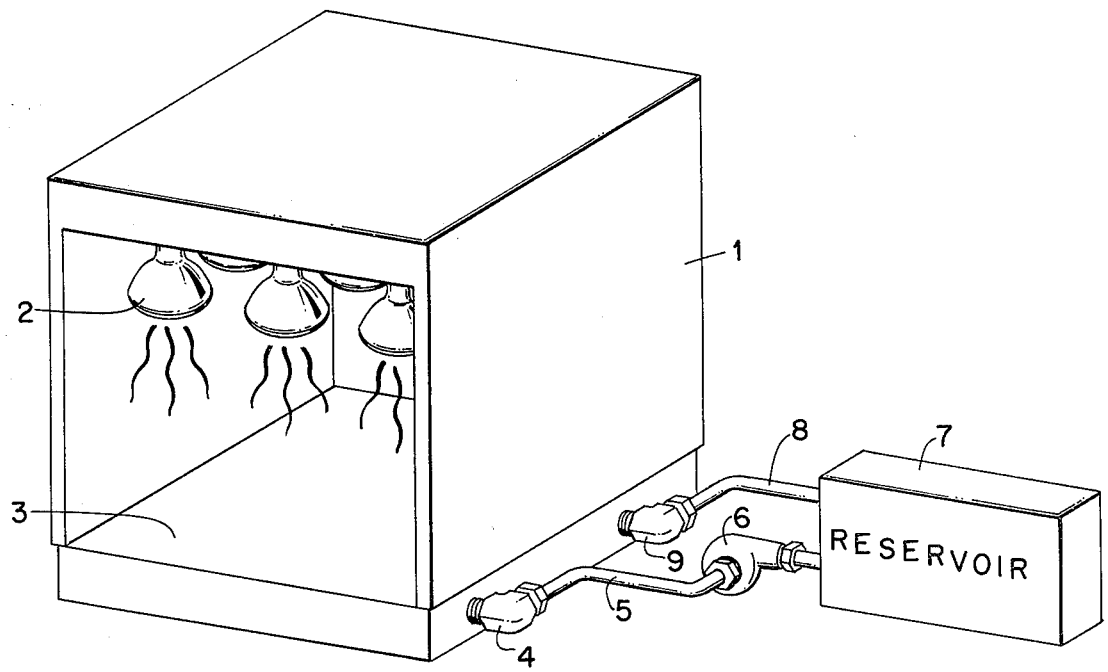
FIG. 1 is a schematic view depiction of a radiant oven having a circulating fluid platen bottom section.

FIG. 1 depicts a radiant oven 1 having a radiant heat source 2 in which foods may be baked. The door of the oven is deleted for simplicity, but may be hinged in any conventional manner.

The bottom 3 of the oven comprises a platen having an enclosed fluid channel within the platen which begins at platen outlet connection 4, crisscrosses through the center of platen 1 and ends at platen inlet connection 9. The bottom platen 1 may be made thusly in a manner similar to conventional steam heating platens.

As described above, the advantage of the present invention is to permit differential cooking of the top and bottom of a pasta or crust food. To achieve a lower cooking temperature for the lower side of a pizza placed in oven 1, for example, a coolant fluid such as water would be circulated through the fluid channel of platen 1 from reservoir 7 by means of fluid connecting lines 5 and 8 and circulating pump 6, making a complete enclosed circulation system through connections 4 and 9. The pump 6 is a variable rate flow pump driven by conventional means so that the rate of flow and thus the temperature of the platen bottom 1 may be variably adjusted. The reservoir 7 size must be ample to allow the fluid to withdraw heat energy from platen bottom 1 at a rate sufficient to keep the platen top at a desired temperature.

It can be appreciated that the system of FIG. 1 may also be used to provide high temperature cooking for the lower side with suitable adjustments. For example, superheated steam or molten salts or metals of selective temperatures may be circulated from reservoir 7 equipped with suitable heating means. The radiant heat from heat source 2 can be properly diminished or deleted, depending on the design of oven 1, so that the upper surface of food placed on the now highly heated platen may be cooked as desired. While the two platen systems—high heating versus relative cooling—are not necessarily compatible in a single unit, one skilled in the art can design such a system with the teachings herein.

Figure 2:
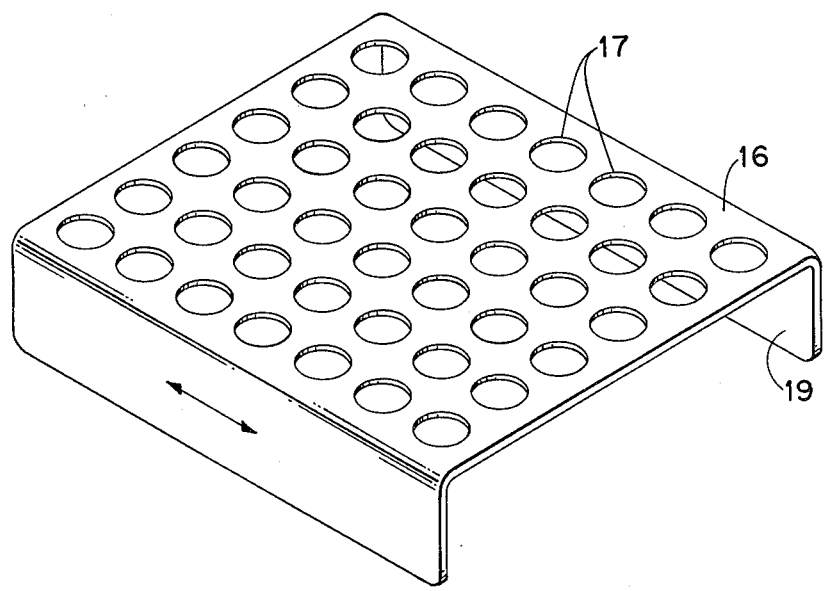
FIG. 2 is a three-dimensional section view of a fluid pan that may be utilized in the invention.
Figure 3:
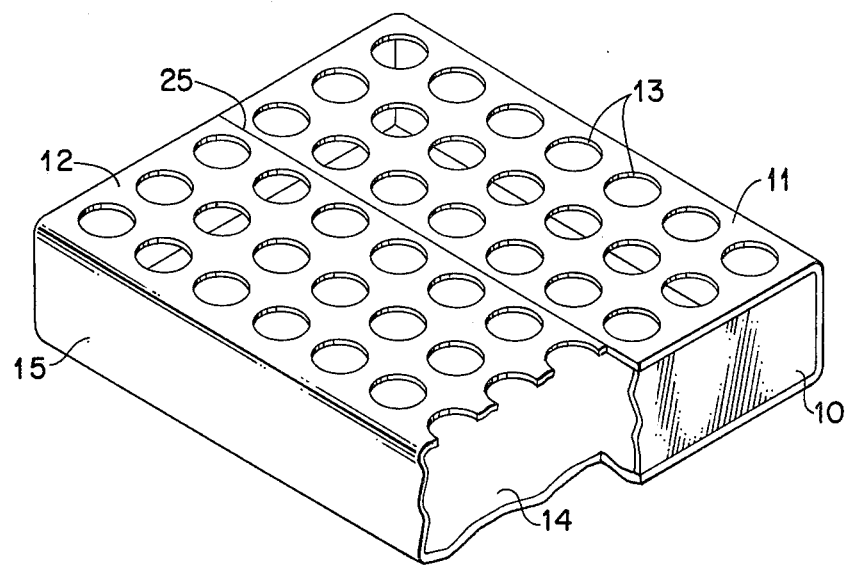
FIG. 3 is a three-dimensional view of the cover to be used with the pan in FIG. 2.

In FIG. 3 a steam pan is shown that can be utilized in more conventional baking ovens. The pan 10 in conjunction with cover 16 (see FIG. 2 and FIG. 4) may be placed in the lower section of a radiant baking oven having an overhead heat source.

The pan 10 comprises a solid bottom 14 and sides 15. Two sides are bent and butted together to form top sections 11 and 12. Each top section 11 and 12 has a determined number of openings 13 into the center of the pan 10. Liquid may be poured into the pan through one or more of the openings 13.

Figure 4:
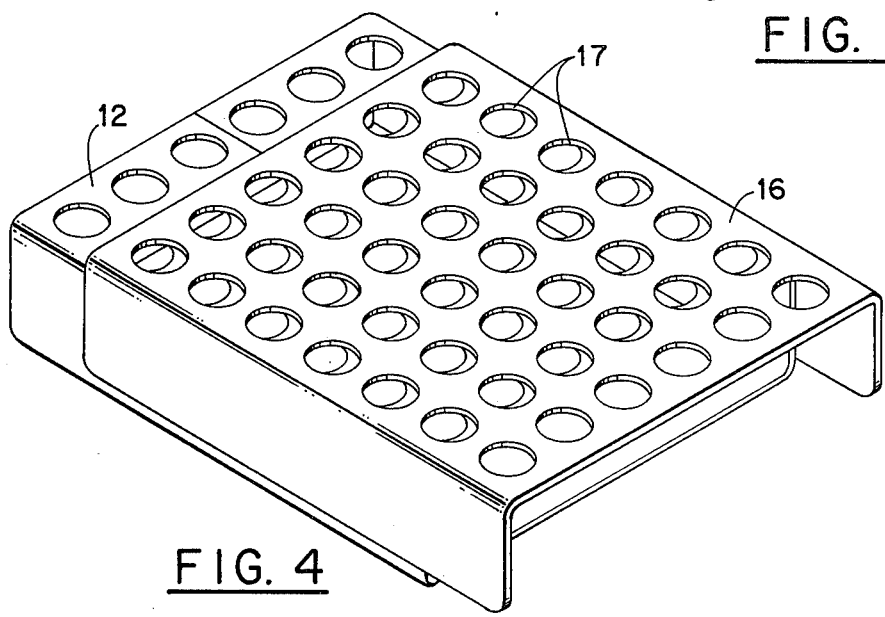
FIG. 4 depicts the combination of pan and cover of FIGS. 2 and 3.

Cover section 16 fits over the pan 10 as shown in FIG. 4 and has openings 17 similar in size and placement to the openings 13 in pan 10. Sides 18 and 19 of the cover 16 position the cover on pan 10.

By adjustment of the cover, alignment of openings 13 and 17 may be accomplished to any desired degree. When in operation, full alignment of the openings permits maximum escape of steam from water in the pan.

Figure 5:
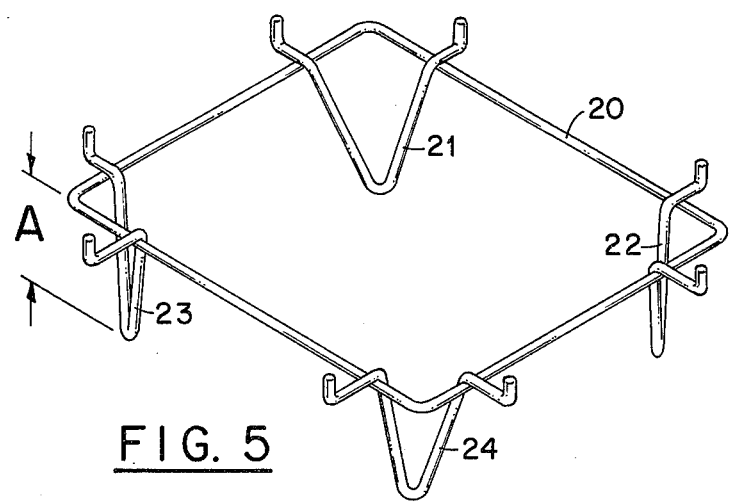
FIG. 5 is a three-dimensional view of a support frame for the pan of FIG. 2.

In the above embodiment, the food to be cooked may be placed directly onto the cover 16 or just above it. If it is desired to cook the lower side of the food faster in ovens having a lower heat radiating source, the food may be placed below the pan, which may be suspended by grating in the oven or by a support frame 20 as shown in FIG. 5. Legs 51 through 24 for frame 20 may be made in any height "A," or adjustable as desired. As the oven is heated with the pan 10 and cover 16 in the overhead position, the pan will tend to remain at the temperature of liquid placed in the pan.

It can be appreciated that other embodiments will come to mind from the above descriptions and the invention is not to be limited to the described embodiments but by the following claims.

I claim:

1. A method of cooking pasta and thin crust foods having a lower surface and an upper surface, comprising the steps of radiantly heating the upper surface to a temperature in the range of 400 to 500 degrees F. while conductively cooling the lower surface to a temperature below 400 degrees F.

2. The method of claim 1, wherein the upper surface is heated by an overhead heat source in a radiant baking oven and the lower surface is relatively cooled by a fluid cooled platen.

3. Food cooking apparatus, comprising a baking oven, radiant heating means in the upper section of the oven, a fluid circulating platen in the lower section of the oven, a fluid reservoir, and means for circulating fluid from the reservoir at a selected rate through the platen.

4. A method of cooking pasta and thin crust foods in a radiant baking oven having fluid recirculating platen bottom, comprising the steps of placing the food in said oven substantially adjacent the platen, radiantly heating the upper surface of the food to a determined temperature while circulating a coolant fluid from a reservoir through the platen at a selected rate and temperature to maintain the surface temperature of the platen at a lower determined temperature.

5. A food cooking apparatus comprising a pan having a bottom and four sides for containing a liquid, said pan having at least one top section, spaced openings in said section, and a cover for said pan having openings similar in spacing and size to said openings in said top section, said cover being adjustable relative to said top section to align the openings in said cover and top section to a desired degree of adjustment.

6. The food cooking apparatus of claim 5, including a support frame for the bottom of said pan and legs on said frame to position said pan a determined height from a nesting surface for the frame.

* * * * *